US012773925B2

(12) United States Patent
Song

(10) Patent No.: US 12,773,925 B2
(45) Date of Patent: Oct. 27, 2026

(54) BATTERY MANAGEMENT APPARATUS AND SERVER FOR APPLYING OPTIMIZED BATTERY SETTING PARAMETER

(71) Applicant: LG ENERGY SOLUTION, LTD., Seoul (KR)

(72) Inventor: Yee Gahng Song, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 51 days.

(21) Appl. No.: 18/837,091

(22) PCT Filed: Feb. 14, 2023

(86) PCT No.: PCT/KR2023/002161
§ 371 (c)(1),
(2) Date: Aug. 8, 2024

(87) PCT Pub. No.: WO2023/158195
PCT Pub. Date: Aug. 24, 2023

(65) Prior Publication Data
US 2025/0162448 A1 May 22, 2025

(30) Foreign Application Priority Data
Feb. 17, 2022 (KR) ........................ 10-2022-0021123

(51) Int. Cl.
*B60L 58/12* (2019.01)

(52) U.S. Cl.
CPC .................................... *B60L 58/12* (2019.02)

(58) Field of Classification Search
None
See application file for complete search history.

(56) References Cited

U.S. PATENT DOCUMENTS

2009/0198396 A1* 8/2009 Rodriguez ........ B60W 30/1882 701/22
2009/0212745 A1 8/2009 Kelty et al.
(Continued)

FOREIGN PATENT DOCUMENTS

CN 110370983 A 10/2019
CN 110549902 A 12/2019
(Continued)

OTHER PUBLICATIONS

International Search Report (with partial translation) and Written Opinion dated May 19, 2023 for corresponding International Patent Application No. PCT/KR2023/002161.
(Continued)

*Primary Examiner* — Steven Vu Nguyen
*Assistant Examiner* — Melanie G Huber
(74) *Attorney, Agent, or Firm* — Morgan, Lewis & Bockius LLP

(57) ABSTRACT

A battery management apparatus according to an embodiment disclosed herein includes a controller configured to extract a driving pattern of a vehicle having mounted thereon a battery based on driving information of the vehicle, extract a battery setting parameter corresponding to the driving pattern of the vehicle, and control the battery based on the extracted battery setting parameter and a communication unit configured to transmit at least any one of information about the driving pattern of the vehicle and the extracted battery setting parameter to a server and transmit a battery setting parameter previously applied to the battery to the server at specific periods.

15 Claims, 5 Drawing Sheets

(56) References Cited

U.S. PATENT DOCUMENTS

| | | | | |
|---|---|---|---|---|
| 2014/0046595 | A1* | 2/2014 | Segawa | G01C 21/34 701/400 |
| 2015/0012174 | A1 | 1/2015 | Kim et al. | |
| 2015/0251557 | A1* | 9/2015 | Ota | G01R 31/3648 702/158 |
| 2015/0329003 | A1* | 11/2015 | Li | B60L 58/16 320/134 |
| 2019/0178945 | A1 | 6/2019 | Zhuo et al. | |
| 2020/0074297 | A1* | 3/2020 | Lee | H02J 7/0047 |
| 2020/0269722 | A1* | 8/2020 | Aykol | G05B 13/0265 |
| 2021/0138983 | A1* | 5/2021 | Sato | B60R 16/033 |
| 2021/0390420 | A1* | 12/2021 | Barnett | G06N 5/02 |
| 2022/0011368 | A1* | 1/2022 | Baek | B60L 58/10 |
| 2022/0187374 | A1* | 6/2022 | Zhang | B60L 3/12 |

FOREIGN PATENT DOCUMENTS

| | | | |
|---|---|---|---|
| JP | 2009-234508 | A | 10/2009 |
| JP | 2020-071829 | A | 5/2020 |
| JP | 2020-145186 | A | 9/2020 |
| KR | 10-2011-0139610 | A | 12/2011 |
| KR | 10-2015-0006222 | A | 1/2015 |
| KR | 10-1526118 | B1 | 6/2015 |
| KR | 10-1827124 | B1 | 2/2018 |
| KR | 10-2019-0070837 | A | 6/2019 |
| KR | 10-2020-0080352 | A | 7/2020 |
| KR | 10-2021-0057839 | A | 5/2021 |
| KR | 10-2021-0118667 | A | 10/2021 |
| KR | 10-2021-0134137 | A | 11/2021 |
| KR | 10-2022-0012534 | A | 2/2022 |

OTHER PUBLICATIONS

Extended European Search Report (EESR) issued on Apr. 28, 2025 in European Patent Application No. 23756607.0 (Note: US 2019/0178945 A1 cited in this EESR has already been cited in a prior IDS.).

Office Action issued on Sep. 24, 2025, in corresponding Japanese Patent Application No. 2024-548473 (with English translation).

* cited by examiner

BATTERY MANAGEMENT APPARATUS AND SERVER FOR APPLYING OPTIMIZED BATTERY SETTING PARAMETER

CROSS-REFERENCE TO RELATED APPLICATION

This application is a U.S. National Stage of PCT International Application No. PCT/KR2023/002161, filed on Feb. 14, 2023, which claims priority to and the benefit of Korean Patent Application No. 10-2022-0021123 filed in the Korean Intellectual Property Office on Feb. 17, 2022, the entire contents of which are incorporated herein by reference.

TECHNICAL FIELD

Embodiments disclosed herein relate to a battery management apparatus and a server.

BACKGROUND ART

An electric vehicle is supplied with electricity from outside to charge a battery, and then a motor is driven by a voltage charged in the battery to obtain power. The battery of the electric vehicle may have heat generated therein by chemical reaction occurring in a process of charging and discharging electricity, and the heat may impair performance and lifetime of the battery. Thus, a battery management apparatus (or a battery management system (BMS)) that monitors and controls temperature, voltage, and current of the battery is driven to diagnose the state of the battery. However, traditional vehicle development systems collectively apply standard operating parameters of experimentally developed batteries to batteries installed in all vehicles. As a result, when a driving pattern of an actual vehicle differs from vehicle to vehicle, many errors occur in battery systems due to generalized battery setting parameters.

DISCLOSURE

Technical Objectives

Embodiments disclosed herein aim to provide a battery management apparatus and a server in which driving information of a vehicle having a battery mounted thereon is precisely analyzed and a battery setting parameter optimized for a driving pattern of the vehicle is applied to a battery.

Technical objects of the embodiments disclosed herein are not limited to the above-described technical objects, and other unmentioned technical objects would be clearly understood by one of ordinary skill in the art from the following description.

Technical Solutions

A battery management apparatus according to an embodiment disclosed herein includes a controller configured to extract a driving pattern of a vehicle having mounted thereon a battery based on driving information of the vehicle, extract a battery setting parameter corresponding to the driving pattern of the vehicle, and control the battery based on the extracted battery setting parameter and a communication unit configured to transmit at least any one of information about the driving pattern of the vehicle and the extracted battery setting parameter to a server and transmit a battery setting parameter previously applied to the battery to the server at specific periods.

According to an embodiment, the battery management apparatus may further include a memory storing a plurality of battery setting parameters, in which the controller is further configured to repeatedly extract the battery setting parameter corresponding to the driving pattern of the vehicle from among the plurality of battery setting parameters at specific periods.

According to an embodiment, the communication unit may be further configured to receive driving information of the vehicle from another control device of the vehicle.

According to an embodiment, the communication unit may be further configured to receive from the server, at least one optimal battery setting parameter generated based on the driving pattern of the vehicle and the battery setting parameter previously applied to the battery, and the memory may store the at least one optimal battery setting parameter by including the same among the plurality of battery setting parameters.

According to an embodiment, the controller may be further configured to repeatedly extract the battery setting parameter corresponding to the driving pattern of the vehicle among the plurality of battery setting parameters including the at least one optimal battery setting parameter at specific periods and control the battery based on the extracted battery setting parameter.

According to an embodiment, in case that the vehicle operates in a key-off state, the controller may be further configured to apply the extracted battery setting parameter to the battery when the vehicle operates in an idle state or a consent to change the battery setting parameter of the vehicle is received from the other control device of the vehicle.

According to an embodiment, the battery setting parameter may include at least any one of an internal resistance, a capacitance, a time constant, a capacity, and an open circuit voltage (OCV) of the battery.

According to an embodiment, the controller may be further configured to extract the driving pattern of the vehicle by applying the driving information of the vehicle to machine learning.

A server according to an embodiment disclosed herein includes a communication unit configured to receive information about a driving pattern of a vehicle having mounted thereon a battery and receive information about a battery setting parameter previously applied to the battery at specific periods and a controller configured to extract a similar vehicle driving pattern that is similar to the driving pattern of the vehicle having mounted thereon the battery from among a plurality of previously stored vehicle driving patterns, extract a battery setting parameter of the similar vehicle driving pattern, and generate at least one optimal battery setting parameter based on the battery setting parameter of the similar vehicle driving pattern.

According to an embodiment, the server may further include a database storing the plurality of vehicle driving patterns and the plurality of battery setting parameters, in which the database stores a battery setting parameter previously applied to the battery, received by the communication unit.

According to an embodiment, the controller may be further configured to generate the at least one optimal battery setting parameter by inputting the battery setting parameter of the similar vehicle driving pattern and the battery setting parameter previously applied to the battery to a genetic algorithm, and the communication unit may be further configured to transmit the at least one optimal battery setting parameter to the vehicle.

According to an embodiment, the controller may be further configured to repeatedly generate the at least one optimal battery setting parameter by repeatedly performing the genetic algorithm based on a set number of times and terminate the genetic algorithm when a number of at least one generated optimal battery setting parameter with respect to a number of battery setting parameters previously applied to the battery exceeds a specific rate.

According to an embodiment, the controller may be further configured to additionally perform the genetic algorithm based on a preset number of additional times, when the number of at least one generated optimal battery setting parameter with respect to the number of battery setting parameters previously applied to the battery is less than or equal to the specific rate.

According to an embodiment, the controller may be further configured to additionally perform the genetic algorithm, and then include the battery setting parameter previously applied to the battery in the at least one optimal battery setting parameter when the number of at least one generated optimal battery setting parameter with respect to the number of battery setting parameters previously applied to the battery is less than or equal to the preset ratio, and the communication unit may be further configured to transmit the at least one optimal battery setting parameter including the battery setting parameter previously applied to the battery to the vehicle.

According to an embodiment, when any one of the at least one optimal battery setting parameter may be equal to the battery setting parameter previously applied to the battery, the controller may be further configured to generate identification information of the optimal battery setting parameter that is equal to the battery setting parameter previously applied to the battery, and the communication unit may be further configured to transmit to the vehicle, the at least one optimal battery setting parameter except for the optimal battery setting parameter equal to the battery setting parameter previously applied to the battery.

Advantageous Effects

With a battery management apparatus and a server according to an embodiment disclosed herein, driving information of a vehicle having a battery mounted thereon may be precisely analyzed to apply a battery setting parameter optimized for a driving pattern of the vehicle to a battery.

MODES FOR PRACTICING INVENTION

Figure 1:
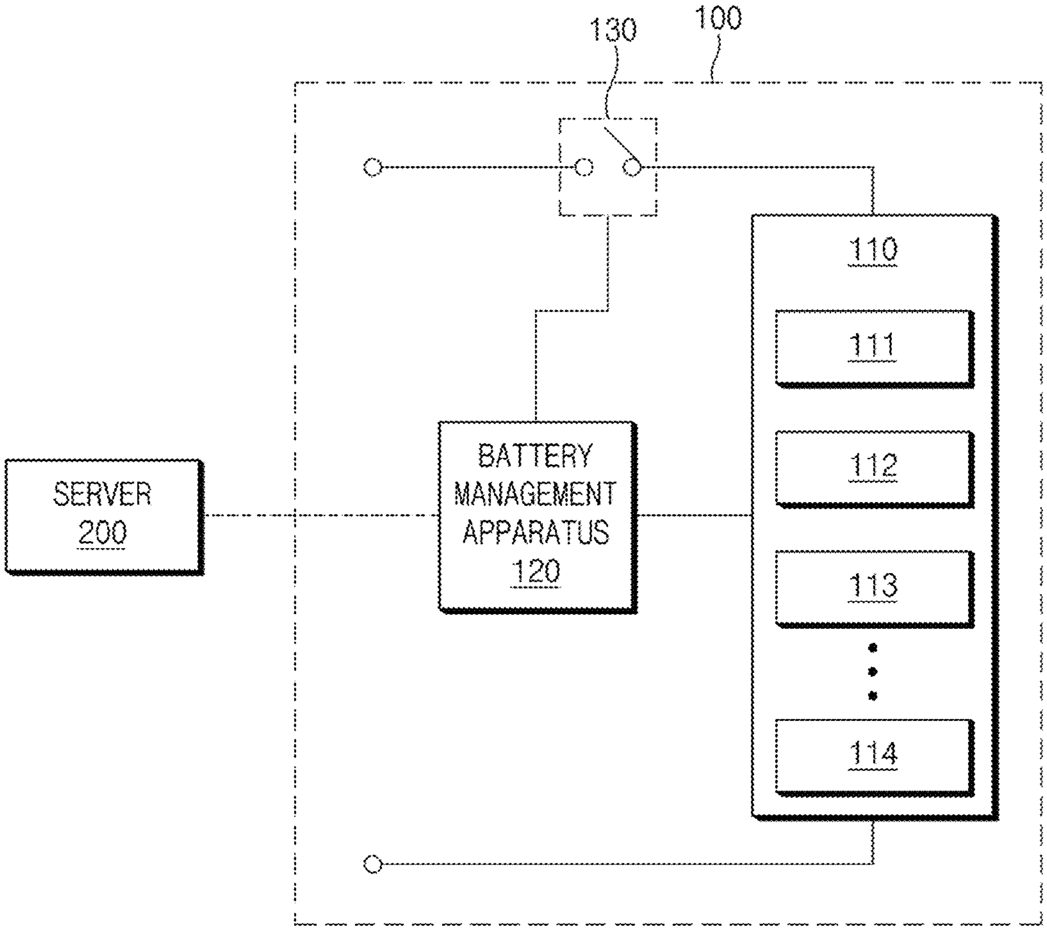
FIG. 1 is a block diagram showing a relationship between a battery management apparatus and a server, according to an embodiment disclosed herein.

Hereinafter, some embodiments disclosed in this document will be described in detail with reference to the example drawings. In adding reference numerals to components of each drawing, it should be noted that the same components are given the same reference numerals even though they are indicated in different drawings. In addition, in describing the embodiments disclosed in this document, when it is determined that a detailed description of a related known configuration or function interferes with the understanding of an embodiment disclosed in this document, the detailed description thereof will be omitted.

To describe a component of an embodiment disclosed herein, terms such as first, second, A, B, (a), (b), etc., may be used. These terms are used merely for distinguishing one component from another component and do not limit the component to the essence, sequence, order, etc., of the component. The terms used herein, including technical and scientific terms, have the same meanings as terms that are generally understood by those skilled in the art, as long as the terms are not differently defined. Generally, the terms defined in a generally used dictionary should be interpreted as having the same meanings as the contextual meanings of the relevant technology and should not be interpreted as having ideal or exaggerated meanings unless they are clearly defined in the present document.

FIG. 1 is a diagram showing a relationship between a battery management apparatus and a server, according to an embodiment disclosed herein.

With reference to FIG. 1, a battery management apparatus 120 may control a battery mounted on a vehicle by communicating with a server 200. Herein, the vehicle may include an electric vehicle driven by rotating a motor with electricity accumulated in a battery of the vehicle.

The battery management apparatus 120 may transmit battery data and vehicle data to the server 200. The battery management apparatus 120 may transmit vehicle data obtained from another control device (not shown) of the vehicle and battery data generated based on the vehicle data to the server 200, and analyze and manage the battery data by using the server 200 with rich computing resources. The battery management apparatus 120 may precisely analyze the battery data through the server 200 to obtain battery data optimized for operating the battery.

The server 200 may generate battery data optimized for controlling a plurality of batteries based on the vehicle data and the battery data obtained from the battery management apparatus 120. The server 200 may include, for example, a cloud computing technique. The server 200 may generate battery data optimized for a plurality of batteries for control over the plurality of batteries based on the cloud computing technique.

The server 200 may generate the battery data optimized for the plurality of batteries and transmit the generated battery data to the battery management apparatus 120. The battery management apparatus 120 may update previously stored battery data upon receiving the optimized battery data from the server 200.

According to an embodiment, the plurality of batteries may be implemented in the form of a battery pack 100 that is installed on an electric vehicle or an energy storage system (ESS) to store electric energy. The battery pack 100 may be a unit that stores electric energy in the electric vehicle. The electric vehicle may include one or more battery packs 100.

The battery pack 100 may include a battery module 110, the battery management apparatus 120, and a relay 130.

The battery module 110 may include a first battery cell 111, a second battery cell 112, a third battery cell 113, and a fourth battery cell 114. Although the plurality of battery cells are illustrated as four in FIG. 1, the present disclosure is not limited thereto, and the battery module 110 may include n battery cells (n is a natural number equal to or greater than 2).

The battery module 110 may supply power to a target device (not shown). To this end, the battery module 110 may be electrically connected to the target device. Herein, the target device may include an electrical, electronic, or mechanical device that operates by receiving power from the battery pack 100 including the plurality of battery cells 111, 112, 113, and 114, and the target device may be, for example, an electric vehicle (EV), but is not limited thereto.

The battery cell 111 may be a lithium ion (Li-ion) battery, a Li-ion polymer battery, a nickel-cadmium (Ni—Cd) battery, a nickel hydrogen (Ni-MH) battery, etc., and may not be limited thereto. Meanwhile, although one battery module 110 is illustrated in FIG. 1, the battery module 110 may be configured in plural according to an embodiment.

The battery management apparatus (or a battery management system (BMS)) 120 may manage and/or control a state and/or an operation of the battery module 110. For example, the battery management apparatus 120 may manage and/or control the states and/or operations of the plurality of battery cells 111, 112, 113, and 114 included in the battery module 110. The battery management apparatus 120 may manage charging and/or discharging of the battery module 110.

In addition, the battery management apparatus 120 may monitor a voltage, a current, a temperature, etc., of the battery module 110 and/or each of the plurality of battery cells 111, 112, 113, and 114 included in the battery module 110. A sensor or various measurement modules for monitoring performed by the battery management apparatus 120, which are not shown, may be additionally installed in the battery module 110, a charging/discharging path, any position of the battery module 110, etc. The battery management apparatus 120 may calculate a parameter indicating a state of the battery module 110, e.g., a state of charge (SoC), a state of health (SoH), etc., based on a measurement value such as monitored voltage, current, temperature, etc.

The battery management apparatus 120 may control an operation of the relay 130. For example, the battery management apparatus 120 may short-circuit the relay 130 to supply power to the target device. The battery management apparatus 120 may short-circuit the relay 130 when a charging device is connected to the battery pack 100.

The battery management apparatus 120 may calculate a cell balancing time of each of the plurality of battery cells 111, 112, 113, and 114. Herein, the cell balancing time may be defined as a time required for balancing of the battery cell. For example, the battery management apparatus 120 may calculate a cell balancing time based on an SoC, a battery capacity, and a balancing efficiency of each of the plurality of battery cells 111, 112, 113, and 114.

Hereinbelow, each of the battery management apparatus 120 and the server 200 will be described in detail.

Figure 2:
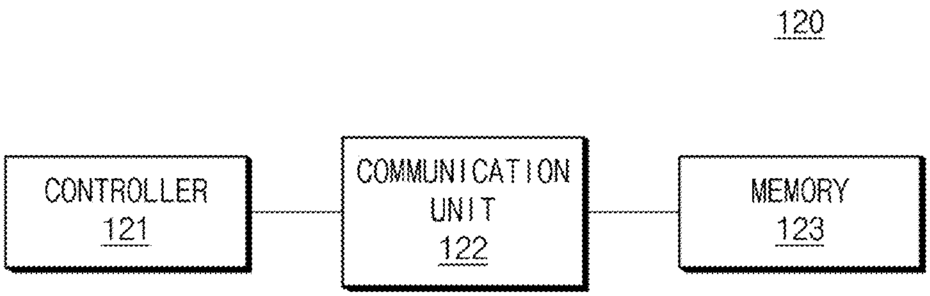
FIG. 2 is a block diagram illustrating a configuration of a battery management apparatus, according to an embodiment disclosed herein.

First, detailed configuration and operation of the battery management apparatus 120 will be described. FIG. 2 is a view showing a configuration of a battery management apparatus according to an embodiment disclosed herein. First, with reference to FIG. 2, the battery management apparatus 120 may include a controller 121, a communication unit 122, and a memory 123.

The controller 121 may extract a driving pattern of a vehicle having mounted thereon the battery pack 100, based on driving information of the vehicle. Herein, the driving information of the vehicle may be defined as a motion input while a user of the vehicle uses the vehicle or an electronic device installed on the vehicle and characteristics of the motion. For example, the driving information of the vehicle may include battery use information according to user's vehicle driving.

The controller 121 may extract the driving pattern of the vehicle by applying the driving information of the vehicle obtained from the other control device of the vehicle to machine learning. Herein, machine learning refers to a technique for predicting a certain result by training a computer.

For example, the controller 121 may extract the driving pattern of the vehicle by inputting the driving information of the vehicle to machine learning with a time-series analysis structure. The time series may be defined as an order of arrangement at specific time periods over time. The machine learning with the time-series analysis structure may include a long short term memory (LSTM). The LSTM algorithm, which is one of artificial neural networks, may be defined as a structure in which a recurrent neural network (RNN) is modified to reflect a long term feature. The LSTM is mainly applied to problems of time-series data showing a change over time. The LSTM algorithm may predict an $(n+1)^{th}$ action for user action time-series data having a length of n.

The controller 121 may extract the battery setting parameter of the battery pack 100 corresponding to the driving pattern of the vehicle based on the driving pattern of the vehicle extracted by applying the driving information of the vehicle to a machine learning model. Herein, the battery setting parameter may include at least any one of a voltage, an internal resistance, a capacitance, a time constant, a capacity, and an open circuit voltage (OCV) of the plurality of battery cells 111, 112, 113, and 114, the battery module 110, or the battery pack 100. However, this parameter may be merely an example and is not limited to the above-described examples.

The controller 121 may extract a battery setting parameter that is most suitable or optimal for the driving pattern of the vehicle from among a plurality of battery setting parameters previously stored in the memory 123.

More specifically, the controller 121 may input the plurality of battery setting parameters to a recursive least squares (RLS) filter, a least mean squares (LMS) filter, or an extended Kalman filter (EKF) to extract a battery setting parameter that is optimal for the driving pattern of the vehicle. Herein, the RLS filter may be defined as a time-series recursive correction algorithm for error minimization. The LMS filter may be defined as an algorithm for extracting a time that minimizes an average error of a group to estimate a probabilistic optimal value. The EKF filter may be defined as an algorithm for correcting a measurement error of a non-linear equivalent model to estimate an actual value.

That is, the controller 121 may extract the battery setting parameter that is optimal for the driving pattern of the vehicle from among the plurality of battery setting parameters based on an RLS filter, an LMS filter, or an EKF filter that reflect characteristics of the driving pattern of the vehicle.

The controller 121 may repeatedly extract the battery setting parameter corresponding to the driving pattern of the vehicle from among the plurality of battery setting parameters at specific periods. That is, the controller 121 may dynamically extract the battery setting parameter corresponding to the driving pattern of the vehicle and a driving history of the vehicle by performing a periodic battery setting parameter extraction operation.

The controller 121 may control the battery pack 100 based on the extracted battery setting parameter. That is, the controller 121 may control at least any one of a voltage, an internal resistance, a capacitance, a time constant, a capacity, and an OCV of the plurality of battery cells 111, 112, 113, and 114, the battery module 110, or the battery pack 100, based on the extracted battery setting parameter.

The controller 121 may control the battery based on the optimal battery setting parameter received by the communication unit 122 from the server 200. Upon receiving the optimal battery setting parameter from the server 200, the controller 121 may include the optimal battery setting parameter in a plurality of existing battery setting parameters and extract the battery setting parameter corresponding to the driving pattern of the vehicle from among the plurality of battery setting parameters including at least one optimal battery setting parameter. The controller 121 may control the battery based on the extracted battery setting parameter.

In case that the vehicle operates in a key-off state, the controller 121 may apply the extracted battery setting parameter to the battery when the vehicle operates in an idle state or a consent to change the vehicle's battery setting parameter is received from the other control device of the vehicle.

The communication unit 122 may receive information about driving of the vehicle from the other control device of the vehicle. Herein, the other control device of the vehicle may be an electronic control unit (ECU) of the vehicle according to an embodiment. The electronic control unit of the vehicle may communicate with another electronic control unit of the vehicle without a host computer in the vehicle through CAN communication.

The communication unit 122 may transmit to the server 200, the vehicle's driving pattern generated by the controller 121 based on information about driving of the vehicle or the battery setting parameter corresponding to the driving pattern of the vehicle extracted by the controller 121 from among the plurality of battery setting parameters.

The communication unit 122 may transmit the battery setting parameter applied to the plurality of battery cells 111, 112, 113, and 114, the battery module 110, or the battery pack 100 to the server 200 at specific periods.

The communication unit 122 may receive from the server 200, at least one optimal battery setting parameter generated by the server 200 based on the driving pattern of the vehicle and the battery setting parameter previously applied to the battery.

According to an embodiment, the communication unit 122 may verify integrity in terms of loss or distortion of the at least one optimal battery setting parameter generated by the server 200. For example, the communication unit 122 may verify the integrity of the at least one optimal battery setting parameter through a checksum check, a cyclic redundancy check (CRC) check, or a secure hash algorithm (SHA) check with respect to the at least one optimal battery setting parameter generated by the server 200.

According to an embodiment, the communication unit 122 may encrypt and decrypt data by using an AES or RSA authentication key when transmitting or receiving the data to or from the server 200. Thus, the communication unit 122 may repeatedly perform self-integrity verification to prevent modification, omission, or erroneous distortion of the battery setting parameters obtained from the server 200.

The memory 123 may store a plurality of battery setting parameters. The memory 123 may store at least one optimal battery setting parameter obtained from the server 200 by including the same among the plurality of battery setting parameters. That is, the memory 123 may store the at least one optimal battery setting parameter obtained from the server 200 accumulatively among the plurality of battery setting parameters.

Figure 3:
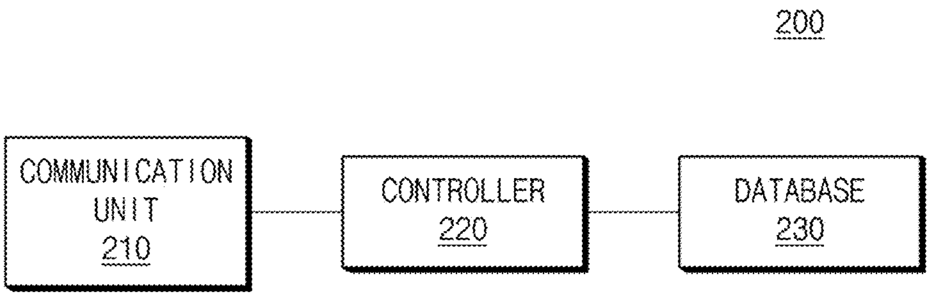
FIG. 3 is a block diagram illustrating a configuration of a server according to an embodiment disclosed herein.

Hereinbelow, detailed configuration and operation of the server 200 will be described with reference to FIG. 3. FIG. 3 is a block diagram illustrating a configuration of a server according to an embodiment disclosed herein. With reference to FIG. 3, the server 200 may include a communication unit 210, a controller 220, and a database 230.

The communication unit 210 may receive information about a driving pattern of a vehicle having mounted thereon a battery from the battery management apparatus 120.

The communication unit 210 may also receive information about a battery setting parameter previously applied to the battery from the battery management apparatus 120 at specific periods. For example, the communication unit 210 may receive the battery setting parameter applied to the plurality of battery cells 111, 112, 113, and 114, the battery module 110, or the battery pack 100 from the battery management apparatus 120 at specific periods. The communication unit 210 may receive a battery setting parameter of a driving pattern of each of a plurality of vehicles from a battery management apparatus of the plurality of vehicles other than the battery management apparatus 120.

The communication unit 210 may transmit at least one optimal battery setting parameter generated by the controller 220 to the battery management apparatus 120. That is, the communication unit 210 may transmit to the battery management apparatus 120, at least one optimal battery setting parameter generated by the server 200 based on the driving pattern of the vehicle and the battery setting parameter previously applied to the battery.

The controller 220 may extract a similar vehicle driving pattern that is similar to the driving pattern of the vehicle having mounted thereon a battery from among a plurality of vehicle driving patterns stored in the database 230. The controller 220 may extract a battery setting parameter of the similar vehicle driving pattern. The controller 220 may generate at least one optimal battery setting parameter based on the battery setting parameter of the similar vehicle driving pattern.

More specifically, the controller 220 may generate the at least one optimal battery setting parameter by inputting the battery setting parameter of the similar vehicle driving pattern and the battery setting parameter applied to the battery to a genetic algorithm.

Herein, the genetic algorithm may be a search technique for finding out an optimal solution by imitating the evolution of organisms while adapting to the environment. The genetic algorithm may operate in a manner of selecting an optimal solution from an initially existing solution group, i.e., a parent group, and repeating a search toward the selected solution to find an optimal solution. That is, the genetic algorithm may be defined as a technique for proposing the optimal solution to a problem rather than an algorithm for solving a specific problem or generating an answer. More specifically, the genetic algorithm may generate child chromosomes that are the solutions of the next generation through mating of parental chromosome populations. The genetic algorithm may select two chromosomes from a parental chromosome group and generate child chromosomes through crossover operations and mutation of each parent chromosome.

The controller 220 may extract at least one similar vehicle driving pattern that is similar to the driving pattern of the vehicle having mounted thereon the battery from among a plurality of battery setting parameters stored in the database 230. The controller 220 may use as a parental chromosome group, the battery setting parameter of the at least one similar vehicle driving pattern and the battery setting parameter applied to the battery obtained periodically from the battery management apparatus 120.

The controller 220 may generate a child battery setting parameter by inputting the battery setting parameter of the at least one similar vehicle driving pattern and the battery setting parameter previously applied to the battery to the genetic algorithm. That is, the controller 220 may generate the optimal battery setting parameter optimized for the vehicle driving pattern by inputting the battery setting parameter of the at least one similar vehicle driving pattern and the battery setting parameter previously applied to the battery to the genetic algorithm.

The controller 220 may repeatedly perform the genetic algorithm based on a set number of times. The controller 220 may repeatedly generate at least one optimal battery setting parameter based on the set number of times and terminate the genetic algorithm when the number of at least one generated optimal battery setting parameter with respect to the number of battery setting parameters previously applied to the battery exceeds a specific rate.

The controller 220 may repeatedly generate at least one optimal battery setting parameter based on the set number of times and further perform the genetic algorithm based on a preset additional number of times when the number of at least one generated optimal battery setting parameter with respect to the number of battery setting parameters previously applied to the battery is less than or equal to the specific rate.

The controller 220 may additionally perform the genetic algorithm, and then include the battery setting parameter previously applied to the battery in the at least one optimal battery setting parameter when the number of at least one generated optimal battery setting parameter with respect to the number of battery setting parameters previously applied to the battery is less than or equal to the preset ratio. When any one of the at least one optimal battery setting parameter is equal to the battery setting parameter previously applied to the battery, the controller 220 may generate identification information of the optimal battery setting parameter that is equal to the battery setting parameter previously applied to the battery. The controller 220 may record the identification information of the optimal battery setting parameter that is equal to the battery setting parameter previously applied to the battery.

The communication unit 210 may transmit at least one optimal battery setting parameter generated by the controller 220 to the battery management apparatus 120. For example, the communication unit 210 may transmit to the battery management apparatus 120, the at least one optimal battery setting parameter except for the optimal battery setting parameter equal to the battery setting parameter previously applied to the battery.

The communication unit 210 may compress and encrypt the optimal battery setting parameter generated by the controller 220. For example, the controller 220 may encrypt the generated optimal battery setting parameter by using the AES or RSA authentication key. More specifically, the communication unit 210 may repeatedly perform self-integrity verification to prevent modification, omission, or erroneous distortion of battery setting parameters and vehicle driving information collected, accumulated, managed, evaluated, and verified in the server 200. Thus, the communication unit 210 may encrypt data by using the AES or RSA authentication key when transmitting or receiving the data to or from the server 120.

According to an embodiment, the communication unit 210 may perform a checksum check, a CRC check, or an SHA check with respect to the at least one optimal battery setting parameter generated by the server 220 to verify the integrity of the at least one optimal battery setting parameter generated by the controller 220.

The database 230 may store the vehicle driving pattern received by the communication unit 210 from the battery management apparatus 120. The database 230 may also store the battery setting parameter applied to the battery, received by the communication unit 210 from the battery management apparatus 120.

Figure 4:
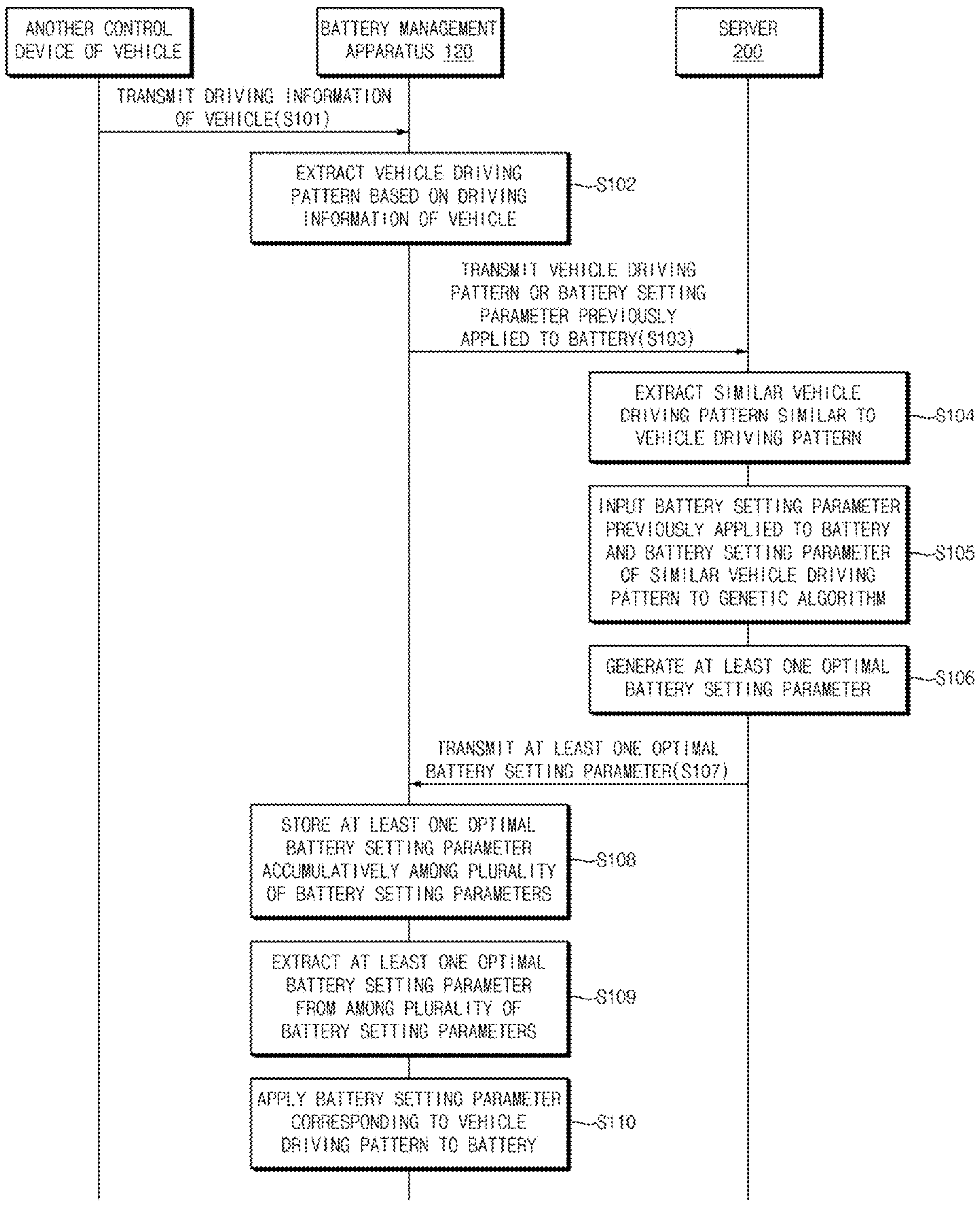
FIG. 4 is a view showing an operating method of a battery management apparatus and a server, according to an embodiment disclosed herein.

FIG. 4 is a view showing an operating method of a battery management apparatus and a server, according to an embodiment disclosed herein.

With reference to FIG. 4, in operation S101, the battery management apparatus 120 may receive driving information of the vehicle from another control device of the vehicle.

In operation S102, the battery management apparatus 120 may extract the driving pattern of the vehicle by applying the driving information of the vehicle obtained from the other control device of the vehicle to machine learning.

In operation S103, the battery management apparatus 120 may transmit the vehicle driving pattern or the battery setting parameter previously applied to the battery among the plurality of battery setting parameters to the server 200.

In operation S103, the server 200 may receive information about the battery setting parameter previously applied to the battery from the battery management apparatus 120 at specific periods. In operation S103, the server 200 may receive a battery setting parameter of a driving pattern of each of a plurality of vehicles from a battery management apparatus of the plurality of vehicles other than the battery management apparatus 120. Although it is illustrated in FIG. 4 that the server 200 receives the battery setting parameter from one battery management apparatus, the present disclosure is not limited thereto, and the server 200 may receive battery setting parameters from n battery management apparatuses (n is a natural number equal to or greater than 2).

In operation S104, the server 200 may extract a similar vehicle driving pattern that is similar to the driving pattern of the vehicle having mounted thereon the battery from among a plurality of stored vehicle driving patterns.

In operation S105, the server 200 may input the battery setting parameter of the similar vehicle driving pattern and the battery setting parameter applied to the battery to a genetic algorithm.

In operation S106, the server 200 may generate at least one optimal battery setting parameter based on the battery setting parameter of the similar vehicle driving pattern.

In operation S106, the server 200 may compress and encrypt the optimal battery setting parameter generated by the controller 200.

In operation S107, the server 200 may transmit at least one optimal battery setting parameter generated by the controller 200 to the battery management apparatus 120.

In operation S108, the battery management apparatus 120 may store the at least one optimal battery setting parameter obtained from the server 200 accumulatively among the plurality of battery setting parameters.

In operation S109, the battery management apparatus 120 may extract a battery setting parameter that is optimal for the driving pattern of the vehicle from among a plurality of battery setting parameters previously stored in the memory 120. In operation S109, more specifically, the battery management apparatus 120 may input the plurality of battery setting parameters to an RLS filter, an LMS filter, or an EKF to extract a battery setting parameter that is optimal for the driving pattern of the vehicle.

In operation S109, the battery management apparatus 120 may repeatedly extract the battery setting parameter corresponding to the driving pattern of the vehicle from among the plurality of battery setting parameters at specific periods. In operation S109, that is, the battery management apparatus 120 may dynamically extract the battery setting parameter corresponding to the driving pattern of the vehicle and a driving history of the vehicle by performing a periodic battery setting parameter extraction operation.

In operation S110, the battery management apparatus 120 may control the battery pack 100 based on the extracted battery setting parameter. In operation S110, that is, the battery management apparatus 120 may control at least any one of a voltage, an internal resistance, a capacitance, a time constant, a capacity, and an OCV of the plurality of battery cells 111, 112, 113, and 114, the battery module 110, or the battery pack 100, based on the extracted battery setting parameter.

In operation S110, in case that the vehicle operates in a key-off state, the battery management apparatus 120 may apply the extracted battery setting parameter to the battery when the vehicle operates in an idle state or a consent to change the vehicle's battery setting parameter is received from the other control device of the vehicle.

As described above, with the battery management apparatus 120 and the server 200 according to an embodiment disclosed herein, driving information of a vehicle having a battery mounted thereon may be precisely analyzed to apply a battery setting parameter optimized for a driving pattern of the vehicle to a battery.

Moreover, the battery management apparatus 120 and the server 200 may first analyze driving information of a vehicle having mounted thereon a battery by using a vehicle pattern analysis model mounted on the battery management apparatus, transmit the vehicle driving pattern and the battery setting parameter applied to the battery to the server having rich computing resources for precise analysis, and reduce communication resources to lighten storage and computing power of the cloud computer included in the server.

The battery management apparatus 120 and the server 200 may transmit necessary minimum battery data to the server without a data loss to reduce infrastructure investment cost and network cost of the server.

Furthermore, the battery management apparatus 120 and the server 200 may periodically update the optimal battery setting parameter to which the driving pattern of the vehicle having mounted thereon the battery is reflected, thereby establishing the battery system optimized for vehicle driving.

Figure 5:
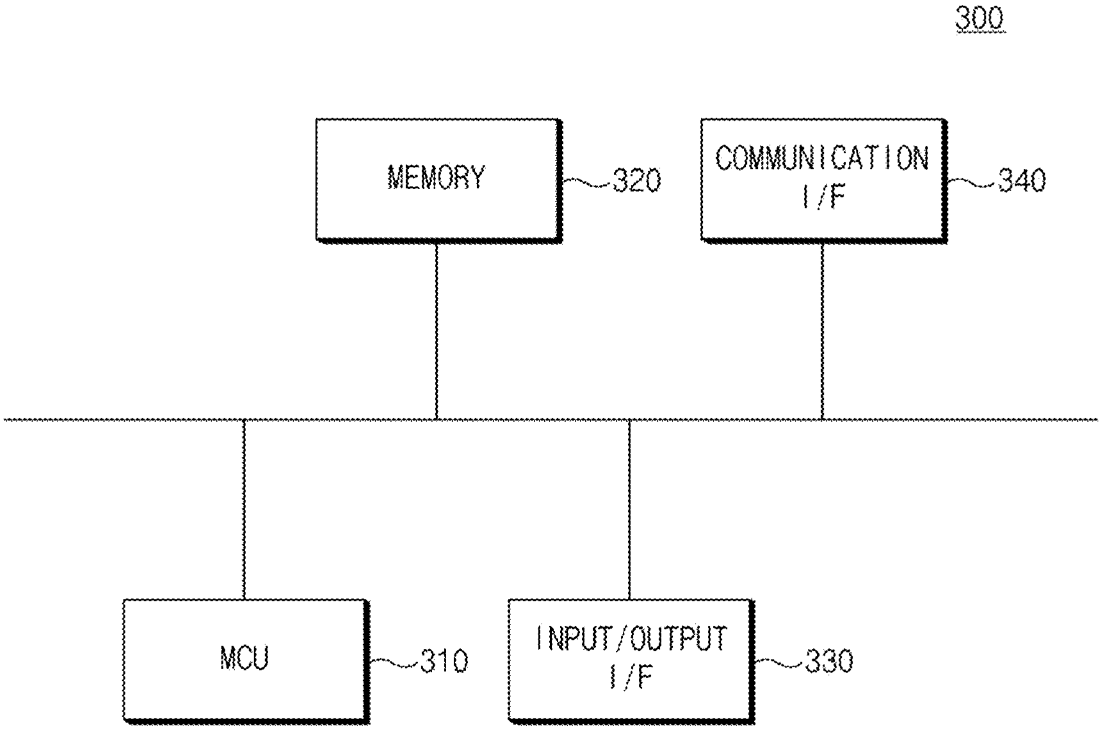
FIG. 5 is a block diagram showing a hardware configuration of a computing system for implementing a battery management apparatus according to an embodiment disclosed herein.

FIG. 5 is a block diagram showing a hardware configuration of a computing system for implementing a battery management apparatus according to an embodiment disclosed herein.

Referring to FIG. 5, a computing system 300 according to an embodiment disclosed herein may include an MCU 310, a memory 320, an input/output I/F 330, and a communication I/F 340.

The MCU 310 may be a processor that executes various programs (e.g., a program for controlling the battery setting parameter of the battery cell) stored in the memory 320, processes various data through these programs, and performs the above-described functions of the battery management apparatus 120 shown in FIG. 1.

The memory 320 may store various programs regarding operations. The memory 320 may also store operation data.

The memory 320 may be provided in plural, depending on a need. The memory 320 may be volatile memory or non-volatile memory. For the memory 320 as the volatile memory, random access memory (RAM), dynamic RAM (DRAM), static RAM (SRAM), etc., may be used. For the memory 320 as the nonvolatile memory, read only memory (ROM), programmable ROM (PROM), electrically alterable ROM (EAROM), erasable PROM (EPROM), electrically erasable PROM (EEPROM), flash memory, etc., may be used. The above-listed examples of the memory 320 are merely examples and are not limited thereto.

The input/output I/F 330 may provide an interface for transmitting and receiving data by connecting an input device (not shown) such as a keyboard, a mouse, a touch panel, etc., and an output device such as a display (not shown), etc., to the MCU 310.

The communication I/F 340, which is a component capable of transmitting and receiving various data to and from a server, may be various devices capable of supporting wired or wireless communication. For example, a program for resistance measurement and abnormality diagnosis of the battery cell or various data may be transmitted and received to and from a separately provided external server through the communication I/F 340.

As such, a computer program according to an embodiment disclosed herein may be recorded in the memory 320 and processed by the MCU 310, thus being implemented as a module that performs respective functions of the battery management apparatus 120 described with reference to FIGS. 1 and 2.

The above description is merely illustrative of the technical idea of the present disclosure, and various modifications and variations will be possible without departing from the essential characteristics of the present disclosure by those of ordinary skill in the art to which the present disclosure pertains.

Therefore, the embodiments disclosed in the present disclosure are intended for explanation rather than limitation of the technical spirit of the present disclosure and the scope of the technical spirit of the present disclosure is not limited by these embodiments. The protection scope of the present disclosure should be interpreted based on the following claims, and all technical spirits within the same scope should be understood to be included in the scope of the present disclosure.

The invention claimed is:

1. A battery management apparatus for a vehicle having a battery, comprising:

a memory storing a plurality of battery setting parameters;

a controller configured to extract a driving pattern of the vehicle based on driving information of the vehicle, extract a battery setting parameter corresponding to the driving pattern of the vehicle from among the plurality of battery setting parameters stored in the memory, and control the battery based on the extracted battery setting parameter; and a communication interface configured to transmit at least one of the driving pattern of the vehicle and a battery setting parameter previously applied to the battery to a server at specific periods and to receive from the server at least one optimal battery setting parameter, wherein the plurality of battery setting parameters stored in the memory include the at least one optimal battery setting parameter received from the server, and wherein each of the plurality of battery setting parameters comprises at least one of an internal resistance, a capacitance, a time constant, a capacity, and an open circuit voltage (OCV) of the battery.

2. The battery management apparatus of claim 1, wherein the controller is further configured to repeatedly extract the battery setting parameter corresponding to the driving pattern of the vehicle from among the plurality of battery setting parameters at specific periods.

3. The battery management apparatus of claim 2, wherein the communication interface is further configured to receive the driving information of the vehicle from another control device of the vehicle.

4. The battery management apparatus of claim 3, wherein:

the at least one optimal battery setting parameter is generated based on the driving pattern of the vehicle and the battery setting parameter previously applied to the battery, and the memory is configured to store the at least one optimal battery setting parameter by including the at least one optimal battery setting parameter among the plurality of battery setting parameters.

5. The battery management apparatus of claim 4, wherein the controller is further configured to:

repeatedly extract the battery setting parameter corresponding to the driving pattern of the vehicle among the plurality of battery setting parameters comprising the at least one optimal battery setting parameter at specific periods; and control the battery based on the extracted battery setting parameter.

6. The battery management apparatus of claim 5, wherein with the vehicle in a key-off state, the controller is further configured to apply the extracted battery setting parameter to the battery if the vehicle operates in an idle state or if a consent to change the battery setting parameter of the vehicle is received from the other control device of the vehicle.

7. The battery management apparatus of claim 1, wherein the controller is further configured to extract the driving pattern of the vehicle by applying the driving information of the vehicle to machine learning.

8. The battery management apparatus of claim 1, wherein the controller is further configured to input the plurality of battery setting parameters to a recursive least squares filter, a least mean squares filter, or an extended Kalman filter to extract the battery setting parameter corresponding to the driving pattern of the vehicle.

9. A server comprising:

a communication interface configured to receive a driving pattern of a vehicle having a battery and to receive a battery setting parameter previously applied to the battery of the vehicle at specific periods; and a controller configured to extract a reference vehicle driving pattern that is approximate to the received driving pattern of the vehicle from among a plurality of previously stored vehicle driving patterns, extract a battery setting parameter of the reference vehicle driving pattern among a plurality of stored battery setting parameters, and generate at least one optimal battery setting parameter based on the battery setting parameter of the reference vehicle driving pattern and the received battery setting parameter previously applied to the battery of the vehicle, wherein the controller is further configured to generate the at least one optimal battery setting parameter by inputting the battery setting parameter of the reference vehicle driving pattern and the received battery setting parameter previously applied to the battery of the vehicle to a genetic algorithm, and wherein each of the plurality of stored battery setting parameters comprises at least one of an internal resistance, a capacitance, a time constant, a capacity, and an open circuit voltage (OCV) of the battery.

10. The server of claim 9, further comprising a database storing the plurality of vehicle driving patterns and the plurality of battery setting parameters, wherein the database stores the battery setting parameter previously applied to the battery, received by the communication interface.

11. The server of claim 9, wherein:

the communication interface is further configured to transmit the at least one optimal battery setting parameter to the vehicle.

12. The server of claim 11, wherein the controller is further configured to:

repeatedly generate the at least one optimal battery setting parameter by repeatedly performing the genetic algorithm based on a set number of times; and terminate the genetic algorithm if a ratio of a number of the at least one generated optimal battery setting parameter with respect to a number of battery setting parameters previously applied to the battery exceeds a preset ratio.

13. The server of claim 12, wherein the controller is further configured to additionally perform the genetic algorithm based on a preset number of additional times, if the ratio of the number of the at least one generated optimal battery setting parameter with respect to the number of battery setting parameters previously applied to the battery is less than or equal to the preset ratio.

14. The server of claim 13, wherein:

the controller is further configured to additionally perform the genetic algorithm, and then to include the battery setting parameter previously applied to the battery in the at least one optimal battery setting parameter if the ratio of the number of the at least one generated optimal battery setting parameter with respect to the number of battery setting parameters previously applied to the battery is less than or equal to the preset ratio, and the communication interface is further configured to transmit the at least one optimal battery setting parameter comprising the battery setting parameter previously applied to the battery to the vehicle.

15. The server of claim 14, wherein:

if any one of the at least one optimal battery setting parameter is equal to the battery setting parameter previously applied to the battery, the controller is further configured to generate identification information of the optimal battery setting parameter that is equal to the battery setting parameter previously applied to the battery, and the communication interface is further configured to transmit to the vehicle the at least one optimal battery setting parameter, except for the optimal battery setting parameter equal to the battery setting parameter previously applied to the battery.

* * * * *